US010473793B2

United States Patent
Neubecker et al.

(10) Patent No.: US 10,473,793 B2
(45) Date of Patent: Nov. 12, 2019

(54) V2V COLLABORATIVE RELATIVE POSITIONING SYSTEM

(71) Applicant: Ford Global Technologies, LLC, Dearborn, MI (US)

(72) Inventors: Cynthia M. Neubecker, Westland, MI (US); Somak Datta Gupta, Canton, MI (US); Oliver Lei, Windsor (CA); Allen R. Murray, Lake Orion, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 506 days.

(21) Appl. No.: 15/409,787

(22) Filed: Jan. 19, 2017

(65) Prior Publication Data

US 2018/0203130 A1    Jul. 19, 2018

(51) Int. Cl.
| | | |
|---|---|---|
| *G01S 19/46* | (2010.01) | |
| *G01S 19/05* | (2010.01) | |
| *G01S 19/31* | (2010.01) | |
| *H04W 4/06* | (2009.01) | |
| *H04L 29/08* | (2006.01) | |

(52) U.S. Cl.
CPC ............ *G01S 19/46* (2013.01); *G01S 19/05* (2013.01); *G01S 19/31* (2013.01); *H04W 4/06* (2013.01); *H04L 67/12* (2013.01)

(58) Field of Classification Search
None
See application file for complete search history.

(56) References Cited

U.S. PATENT DOCUMENTS

| | | | | |
|---|---|---|---|---|
| 5,280,744 A | * | 1/1994 | DeCarlo | ................... F41G 3/04 235/407 |
| 6,745,124 B2 | * | 6/2004 | Aloi | ....................... G01C 21/26 342/353 |
| 8,165,728 B2 | * | 4/2012 | Schultz | ................. G01S 5/0027 342/107 |
| 8,718,917 B2 | | 5/2014 | Basnayake | |
| 9,104,201 B1 | * | 8/2015 | Pillai | ..................... B64C 39/024 |
| 9,165,470 B2 | * | 10/2015 | Mudalige | ................. G08G 1/22 |
| 10,096,176 B1 | * | 10/2018 | Namineni | .............. G07C 5/008 |
| 10,288,745 B2 | * | 5/2019 | Mudalige | ................ G01S 19/46 |
| 2004/0061600 A1 | * | 4/2004 | Wehner | ................. G01S 5/0072 340/435 |
| 2005/0256637 A1 | * | 11/2005 | Tazartes | ................. G01C 21/16 701/408 |
| 2006/0161341 A1 | * | 7/2006 | Haegebarth | .............. G08G 1/20 701/117 |
| 2008/0154499 A1 | * | 6/2008 | Tanaka | ................. G01C 21/362 701/431 |
| 2010/0164789 A1 | * | 7/2010 | Basnayake | ............ G01S 5/0072 342/357.23 |

(Continued)

FOREIGN PATENT DOCUMENTS

GB          2543930 A       3/2015

*Primary Examiner* — Genna M Mott
*Assistant Examiner* — Nicholas A Mahon
(74) *Attorney, Agent, or Firm* — Frank L. Lollo (57) ABSTRACT

A method is provided of enhancing GPS data of a host vehicle within a cluster. V2V messages within the cluster are exchanged. A respective vehicle having a highest GPS trust factor is identified utilizing GPS data within the V2V messages. The GPS data of the host vehicle is adjusted as a function of GPS position of the identified vehicle and relative position data between the host vehicle and the identified vehicle.

16 Claims, 4 Drawing Sheets

(56) References Cited

U.S. PATENT DOCUMENTS

| | | | |
|---|---|---|---|
| 2012/0089319 A1* | 4/2012 | Basnayake | G01C 21/28 701/300 |
| 2012/0095651 A1* | 4/2012 | Anderson | G05D 1/0274 701/50 |
| 2012/0306634 A1* | 12/2012 | Tsuda | B60Q 1/2611 340/425.5 |
| 2013/0093618 A1 | 4/2013 | Oh et al. | |
| 2013/0282277 A1* | 10/2013 | Rubin | G08G 9/02 701/517 |
| 2014/0070980 A1 | 3/2014 | Park | |
| 2014/0163870 A1* | 6/2014 | Riley | G01C 21/00 701/470 |
| 2014/0302774 A1* | 10/2014 | Burke | G07C 5/08 455/3.05 |
| 2015/0134182 A1* | 5/2015 | Ollis | G08G 1/22 701/23 |
| 2015/0149083 A1 | 5/2015 | Lee | |
| 2016/0018230 A1* | 1/2016 | Neubecker | G01C 21/34 701/537 |
| 2016/0018527 A1 | 1/2016 | Oh et al. | |
| 2016/0090105 A1* | 3/2016 | Neubecker | B60W 40/02 701/23 |
| 2016/0305791 A1* | 10/2016 | Neubecker | B60L 58/12 |
| 2017/0053534 A1* | 2/2017 | Lokesh | B60W 30/165 |
| 2017/0178414 A1* | 6/2017 | Neubecker | G06Q 20/3255 |
| 2017/0184726 A1* | 6/2017 | Lee | G01S 19/51 |
| 2017/0243481 A1* | 8/2017 | Neubecker | G08G 1/095 |
| 2017/0244160 A1* | 8/2017 | Neubecker | H01Q 3/08 |
| 2017/0287338 A1* | 10/2017 | Neubecker | B60R 1/00 |
| 2018/0077518 A1* | 3/2018 | Nguyen | H04W 84/00 |
| 2018/0114441 A1* | 4/2018 | Marmet | G01C 21/30 |
| 2018/0151071 A1* | 5/2018 | Park | G01S 13/865 |
| 2018/0190125 A1* | 7/2018 | Hayee | G08G 1/167 |
| 2018/0195864 A1* | 7/2018 | Sengupta | G08G 1/0112 |
| 2018/0196139 A1* | 7/2018 | Brown | G01S 17/89 |
| 2018/0203130 A1* | 7/2018 | Neubecker | G01S 19/05 |
| 2018/0364366 A1* | 12/2018 | Cvijetic | G01S 19/47 |
| 2019/0042859 A1* | 2/2019 | Schubert | G06K 9/00798 |
| 2019/0069051 A1* | 2/2019 | Al-Stouhi | H04Q 9/00 |
| 2019/0069052 A1* | 2/2019 | Al-Stouhi | H04Q 9/00 |
| 2019/0073908 A1* | 3/2019 | Neubecker | G05D 1/0061 |
| 2019/0073909 A1* | 3/2019 | Neubecker | B60Q 1/30 |
| 2019/0094330 A1* | 3/2019 | Adireddy | G01S 1/20 |
| 2019/0098462 A1* | 3/2019 | Neubecker | H04W 4/23 |
| 2019/0122312 A1* | 4/2019 | Neubecker | G06Q 30/02 |
| 2019/0144001 A1* | 5/2019 | Choi | B60W 50/14 701/117 |
| 2019/0162792 A1* | 5/2019 | Neubecker | G01R 31/387 |
| 2019/0180623 A1* | 6/2019 | Lee | G08G 1/166 |
| 2019/0191265 A1* | 6/2019 | Altintas | H04W 4/70 |
| 2019/0196501 A1* | 6/2019 | Lesher | B60T 7/22 |
| 2019/0204853 A1* | 7/2019 | Miller, Jr. | H04W 4/46 |

* cited by examiner

V2V COLLABORATIVE RELATIVE POSITIONING SYSTEM

CROSS REFERENCE TO RELATED APPLICATIONS

Not Applicable.

STATEMENT REGARDING FEDERALLY SPONSORED RESEARCH

Not Applicable.

BACKGROUND OF INVENTION

The present invention relates generally to GPS-based positioning using V2V collaboration.

A Global Positioning System (GPS) operates by tracking line of sight signals. Line of sight propagation transmits and receives signals only when the receiving devices are in view of each other without any obstacle or obstruction therebetween. An example of a line of sight transmission signal is that used by GPS devices to receive satellite transmission for vehicles.

A GPS receiving device requires a respective minimum number of signals to obtain a high confidence level that the determined position is accurate with minimal errors. A GPS receiver typically must receive unobstructed signals from a minimum of four or more satellites to accurately determine its position. However, in many instances, natural obstructions (e.g., trees, hills, weather) or man-made obstructions (e.g., buildings) may reduce the optimum number of satellites required to accurately determine a position of the receiving device.

In addition, other factors contributing to the accuracy of the receiver may include, but are not limited to, atmospheric delays, clock errors, orbital errors, and multi-path signals. These may require more than the optimal number of satellites available to accurately determine the position of the receiver.

When determining a respective GPS position of a vehicle, if a determination is made that the receiving device of a vehicle is obtaining less than the optimal number of satellite signals than desired, then GPS data can be obtained from other vehicles to enhance the confidence level of the vehicle receiver having less than the optimum number of satellites. However, an issue presents itself when less than an optimal number of satellites signals are obtained and a determination needs to be made as to what other positioning data might be relied on.

SUMMARY OF INVENTION

In one aspect of the invention, a vehicle-to-vehicle collaborative positioning system is provided such that if a host vehicle is receiving less than an optimum number of satellites signals, the host vehicle utilizes GPS data of a neighboring vehicle in a cluster of vehicles in addition to relative positioning data obtained from on-board sensing devices such as radar, Lidar, or camera systems to adjust and increase the GPS data of the host vehicle from its original state. In addition, if all vehicles within a cluster are receiving less than the optimum number of satellite signals, each vehicle may identify neighboring vehicles receiving the same number of satellite signals as the host vehicle and average the GPS data utilizing the host vehicle GPS data and those identified remote vehicle GPS data. The identified remote vehicles are selected for averaging by the host vehicle if the distance between the host vehicle and the remote vehicle is less than an accuracy radius of the identified neighboring vehicle. The accuracy radius is a function of the degree of closeness that the GPS readings are to the actual position, and determined by the quality of GPS receiver, the characteristics of the surroundings, the number of satellite signals and timing errors of the GPS. The average GPS data will be cooperatively used with relative positioning data to increase a confidence level of the host vehicle GPS data. The adjusted GPS data is then broadcast to the cluster. Each vehicle within the cluster will identify itself as a host vehicle and identify neighboring remote vehicles as described herein to increase its GPS data confidence level through averaging. Each vehicle then broadcasts its GPS data and its adjusted confidence level to the cluster. Each vehicle within the cluster can then determine which vehicle has the highest GPS data confidence level to rely on.

An embodiment contemplates a method of enhancing GPS data of a host vehicle within a cluster. V2V messages are exchanged within the cluster. A respective vehicle having a highest GPS trust factor is identified utilizing GPS data within the V2V messages. The GPS data of the host vehicle is adjusted as a function of GPS position of the identified vehicle and relative position data between the host vehicle and the identified vehicle.

An embodiment contemplates a collaborative GPS system including a V2V communication system exchanging V2V messages within the cluster. A processor identifies a respective vehicle having a highest GPS trust factor among the cluster. The processor adjusts the GPS data of the host vehicle as a function of GPS position of the identified vehicle and relative position data between the host vehicle and the identified vehicle. The V2V communication system broadcasts the adjusted GPS data.

DETAILED DESCRIPTION

Figure 1:
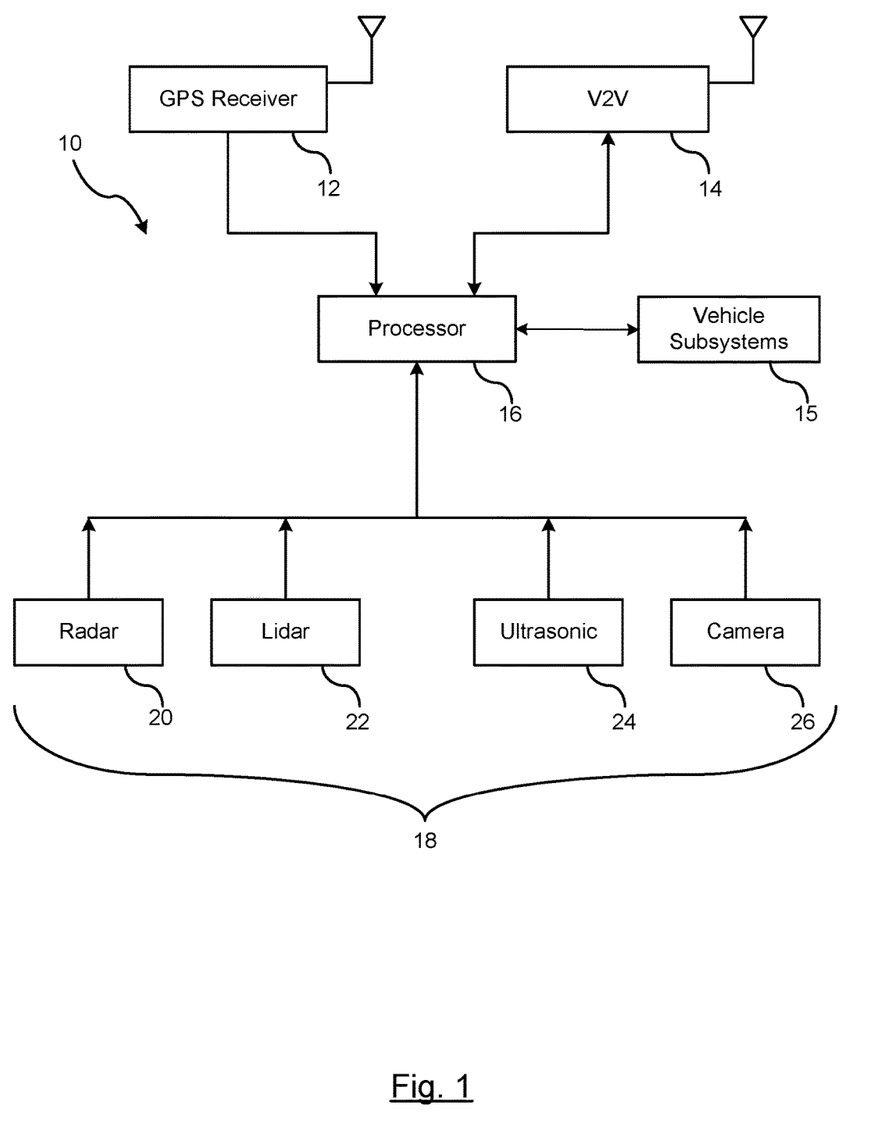
FIG. 1 illustrates a block diagram of the vehicle vehicle-to-vehicle (V2V) collaborative positioning system

There is shown in FIG. 1, a block diagram of the vehicle vehicle-to-vehicle (hereinafter used in the detailed description and claims as V2V) collaborative positioning system 10 for a respective vehicle. The collaborative positioning system 10 includes an onboard Global Positioning System (hereinafter used in the detailed description and claims as GPS) receiver 12, a V2V communication device 14, a processor 16, and other on-board sensing devices 18.

The GPS receiver 12 functions by tracking line of sight signals received by orbiting satellites. The GPS receiver 12 disposed in the vehicle typically requires at least three or more satellites to be continuously available in an unobstructed line of sight. GPS data is received by the GPS receivers 12 for determining its absolute position. In viewing the earth in a two dimensional plane and setting aside altitude, an assumption can be made that the GPS receiver is receiving signals on a two-dimensional plane. Under such conditions, a latitude coordinate and a longitude coordinate is used to identify the GPS receiver position. The first coordinate represents latitude and the second coordinate represents longitude. In addition, a receiving clock timing error may also come into factor. As a result, since three unknown factors need to be determined (i.e., latitude, longitude, clock error), then at least three satellites are required to determine the absolute position. If the altitude of the GPS receiver 12 is taken into consideration, then at least four satellites are needed to determine the absolute position.

If a vehicle is receiving less than the optimal number of satellite signals, a host vehicle may utilize GPS data from a neighboring vehicle to enhance its GPS position. GPS data may be obtained from other vehicles through V2V communications. The V2V communication device 14 includes a transmitter and receiver that automatically communicates with other vehicles having a similar architecture. It should be understood that while V2V communications are described herein and refer to vehicle communicating between one another, the communication system may include other entities (e.g., infrastructure, roadside units, pedestrians) for communicating and exchanging information, which is typically understood as V2X communications. The V2V communication system is a cooperative system based on two-way communications which allows vehicles to interact autonomously with one another in real time for extending a host vehicles awareness of circumstances and conditions occurring in a respective vicinity of the vehicle that a driver of the vehicle may not be able to readily observe. Such systems preferably provide real time data including, but not limited to, status of traffic, collision awareness, and collision avoidance conditions.

The host vehicle and the remote vehicles broadcast V2V wireless messages to one another over an inter-vehicle communication network. An example of such a system includes a dedicated short-range communication (DSRC). The DSRC includes two-way short-to-medium-range wireless communications protocol permitting very high data transmission particularly for active safety applications. Messages broadcast by the V2V communication device 14 are typically broadcast as a standard periodic beacon message. Data communicated within the broadcast message may include, but is not limited to, a vehicle GPS position, environmental awareness conditions relating to vehicle positions, vehicle kinematics/dynamic parameters, and traffic or road events sensed by respective remote vehicles. Environmental awareness conditions communicated between vehicles typically forewarn drivers or a vehicle's safety system of a traffic condition, safety condition, or other condition where an accident is present or a condition is present that could result in an accident. In summary, a V2V communication system enhances a vehicle's awareness by extending the range at which the vehicle or driver can sense or observe events occurring in proximity to the host vehicle.

Various vehicle safety systems 15 of a respective vehicle, such as collision avoidance systems, depend on the accuracy of GPS data of both the host vehicle and remote vehicles. Any errors in the determined positions can influence how a vehicle application utilizes the received GPS data. For example, if a host vehicle receives data regarding a stopped traffic event or a collision event in a road of travel and if the GPS data received by a remote vehicle is in error (e.g., error greater than several meters), then GPS data relied on by the host vehicle may result in incorrect use of the data and may not enable certain systems (e.g., warnings) since the host vehicle may determine that it is not affected by the incident based on the received data. Therefore, it is pertinent that the host vehicle attempts to maintain high accuracy data (minimizing positional errors) with high confidence level as much as possible. The term "trust factor" will be used hereinafter to refer to accuracy and confidence level of the GPS data. It should be understood that the trust factor is defined as either the GPS data accuracy, the GPS confidence level, or the combination of the accuracy and confidence level of the GPS data. While the GPS data having the highest confidence level and highest accuracy is desired, many instances may occur when one vehicle has the highest confidence level but a lower accuracy data than another vehicle, or vice versa. Under such conditions, the trust factor may include predetermined combinations for ranking the trust factor, or a weighted formula may be used providing weights to both the confidence level and accuracy data for determining the ranking of the trust factor.

The vehicle further includes a processor 16 that processes GPS data and other vehicle-related data for use with vehicle applications 15. The processor 16 of the host vehicle receives the V2V message that includes the GPS position and measurement data of remote vehicles in communication range of the host vehicle and determines relative positions between the host vehicle and the remote vehicles using other on-board sensing devices 18 that include, but are not limited to, radar devices 20, Lidar devices 22, ultrasonic devices 24, and cameras 26. Data obtained from the on-board sensing devices 18 may provide relative positioning information that includes, but is not limited to, range, bearing, range rate data. Such data may be further utilized to correct a host vehicle's position by identifying a remote vehicle position having a higher trust factor in comparison to the host vehicle and utilizing the absolute position of the remote vehicle along with relative positioning data obtained from the other sensing devices which can correct errors and enhance the host vehicle's GPS position.

Figure 2:
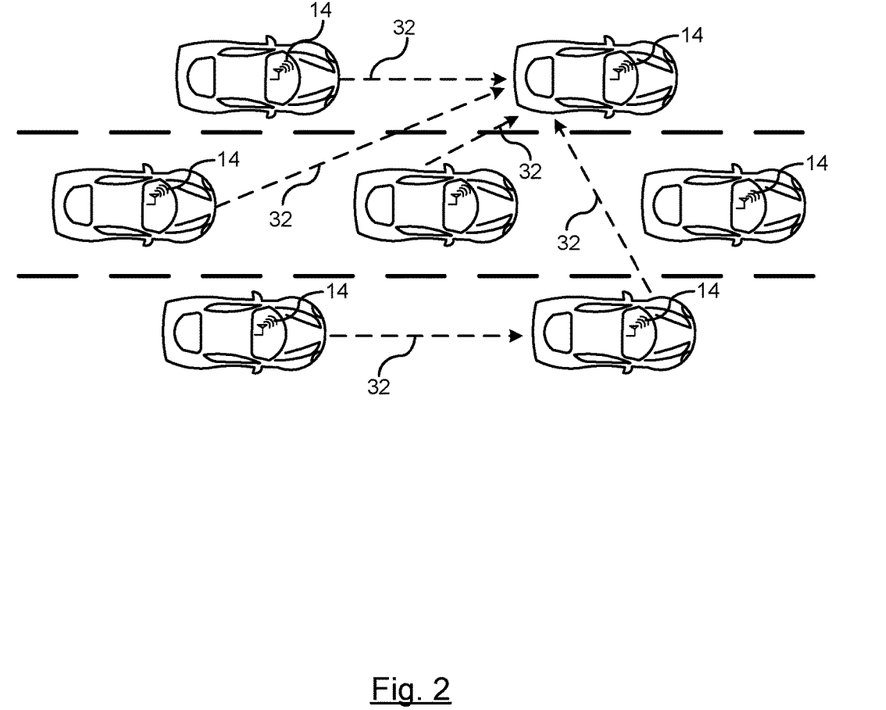
FIG. 2 illustrates a diagrammatic view of vehicles utilizing V2V collaboration to enhance GPS data.

As shown in FIG. 2, a respective group of vehicles is shown traveling in a cluster. Each of the vehicles is equipped with a V2V communication device 14 for exchanging GPS data with one another. The vehicles traveling within a cluster exchange data within a predetermined communication range of one another via V2V communications. For the purposes described herein, each vehicle will consider itself as a host vehicle and other communicating vehicles as remote vehicles. Each vehicle communicating with one another receives a GPS message from another vehicle which includes the accuracy and confidence level of its own GPS data. The GPS message broadcast to the other vehicles in the cluster may provide the number of satellites signals received by the remote vehicle, timing/receiver errors associated with a respective GPS receiver, and the accuracy and a confidence level. Each respective vehicle can determine whether another vehicle within the cluster has a GPS trust factor the same or higher than its own GPS data. If any one of the remote vehicles has a trust factor higher than the host vehicle, and if the remote vehicle is within a line of sight where bearing and range data information 32 from other on-board sensor devices (e.g., Lidar/radar/camera) can be obtained, then the host vehicle may use one or more of the other on-board sensing devices to determine the bearing and range information 32 to the remote vehicle having the higher GPS trust factor. Using the range and bearing data to the identified remote vehicle having the higher GPS trust factor provides a relative position to the remote vehicle. The host vehicle can adjust its own GPS position data to enhance its absolute position accuracy based on the absolute position of the remote vehicle in cooperation with the bearing and range data obtained by the host vehicle. As a result, each vehicle within the V2V communication system can enhance its GPS trust factor by adjusting its GPS position data using a GPS position of the remote vehicle having a higher GPS trust factor within the cluster in cooperation with relative positioning data from the on-board sensing devices.

Figure 3:
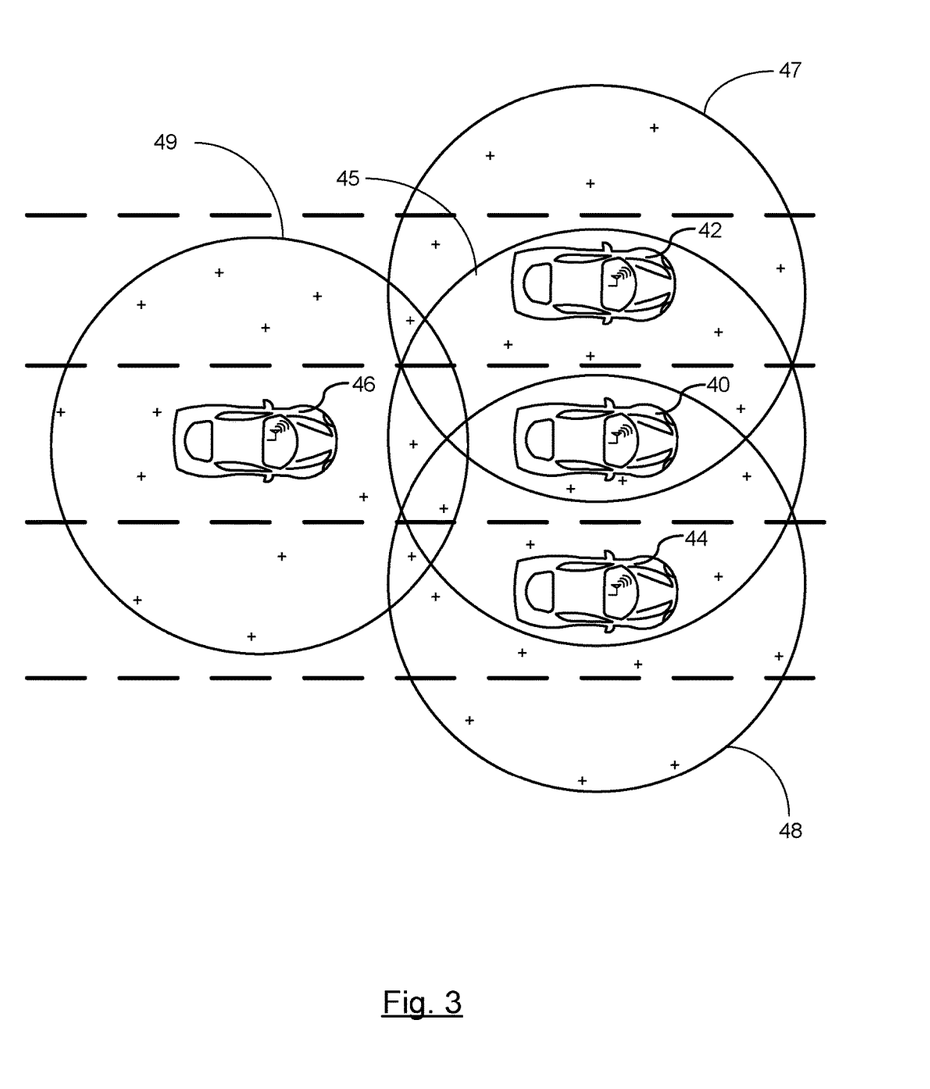
FIG. 3 illustrates a diagrammatic view of vehicle utilizing V2V collaboration and averaging to enhance accuracy of GPS data.

FIG. 3 illustrates a group of vehicles traveling within a cluster where various vehicles within the cluster have a same GPS confidence level. As shown in FIG. 3, each vehicle includes a boundary 45, 47, 48, and 49, herein afterwards referred to as an accuracy radius. The accuracy radius is a function of the degree of closeness that the GPS readings are to the actual position, and determined by the quality of GPS receiver, the characteristics of the surroundings, the number of satellite signals and timing errors of the GPS. For all points within the accuracy radius, each point can represent the vehicle's true position and will have the same associated GPS confidence level. The GPS accuracy is typically calculated using a receiver to measure a single point for a predetermined period of time (e.g., 24 hours). Measurements are plotted and the accuracy radius 45, 47, 48, and 49 for each vehicle is calculated having an associated confidence level. This provides details of how much the accuracy of the GPS receiver has drifted from its true position. For example, the radius boundary of each vehicle as shown may be 3 meters to its center position with a 90% confidence level. As a result, a host vehicle when receiving GPS position data broadcast from a remote vehicle will receive a true position coordinate; however, the true position will be accurate up to 3 meters with about 90% confidence. In the embodiment shown in FIG. 3, each of the vehicles are broadcasting GPS data along with a confidence level. The GPS data has a relative error represented by each circle surrounding each vehicle. Each point within a respective circle may represent the same true position based on the error. Therefore, for each vehicle shown, the GPS receiver of the vehicle has a known accuracy/confidence level and the reading for a vehicle could represent the true position within its accuracy radius (e.g., 3 meters) with a respective confidence level (90%).

For illustrative purposes, each of the vehicles shown in FIG. 3 has a same sized accuracy radius and same confidence level, and therefore, attempting to use the other remote vehicles' GPS data is a constraint when used independently or simultaneously. Therefore, no one vehicle individually can provide a higher confidence level to another vehicle for adjusting and enhancing its GPS data. However, GPS data with a greater confidence level can be calculated utilizing a group of vehicles by averaging GPS data of selected vehicles having a same confidence level.

To select which vehicle's GPS data can be used in the averaging function, a host vehicle must first be in an unobstructed line of sight where one of the on-board sensors can obtain measurement data to determine the relative position between the host vehicle and the remote vehicle. If the vehicle can obtain relative positioning data using at least one of its on-board sensors, then a distance to the remote vehicle is measured. If the distance measured from the host vehicle to the remote vehicle is less than the accuracy radius of the remote vehicle, then the host vehicle can utilize the GPS data of the identified remote vehicle in addition to its own GPS data to derive a more accurate GPS data through an averaging function. The average should take the latitude and longitude separately. This average is referred to as the adjusted GPS data. The adjusted GPS data can be represented by the following representations:

$$Adj_{GPS_{Lat}} = \frac{1}{(n+1)} \sum (GPS_{Lat_H} + GPS_{Lat_1} + \ldots + GPS_{Lat_n}) \quad (1)$$

$$Adj\_GPS_{Lon} = \frac{1}{(n+1)} \sum (GPS_{Lon_H} + GPS_{Lon_1} + \ldots + GPS_{Lon_n}) \quad (2)$$

where $GPS_{Lat_H}$ represents the latitude data of the host vehicle GPS,
$GPS_{Lat_1}, \ldots, GPS_{Lat_n}$ represent each of the GPS latitude data of the remote vehicles,
$GPS_{Lon_H}$ represents GPS longitude data of the host vehicle and
$GPS_{Lon_1}, \ldots, GPS_{Lon_n}$ represent the each of the GPS longitude data of the remote vehicles.

As shown in FIG. 3, vehicle 40 measures a distance to its neighboring vehicles. The distance from vehicle 40 to both vehicles 42 and 44 are both less than the accuracy radius 47 and 48, respectively. Therefore, vehicle 40 can utilize the GPS data of vehicles 42 and 44 in its averaging function. In regards to vehicle 46, the distance between vehicle 40 and vehicle 46 is greater than the accuracy radius 49 of vehicle 46. Therefore, vehicle 46 is not used in the GPS data averaging by vehicle 40. The host vehicle may identify any number of remote vehicles having a measured distance that is less than the accuracy radius of the host along with its own GPS data to generate an adjusted GPS data having a higher confidence level than its own GPS data independently. The greater of vehicles utilizes, the higher the confidence level.

Referring again to FIG. 3, in regards to vehicle 42 functioning as a host vehicle and determining whether vehicle 42 can increase its accuracy, while the distance between vehicle 42 and vehicle 40 is less than the accuracy radius 45 of vehicle 40, the distance between vehicles 44 and 42 is greater than the accuracy radius 48 of vehicle 44. As a result, vehicle 42 can only utilize vehicle 40 and its own GPS data in its averaging function. Similarly, in regards to vehicle 46, the distance to any of vehicles 40, 42, and 44 is greater than the accuracy radius of vehicles 40, 42, and 44, and as a result, no remote vehicles can be used in its averaging. In summary, the greater the number of vehicles that can be averaged, the greater the resulting confidence level.

In response to the host vehicle adjusting its GPS data with a higher confidence level, the host vehicle can broadcast its adjusted GPS data to other remote vehicles within the cluster as part of the V2V message. Each respective vehicle in the cluster can adjust their GPS data utilizing the broadcast adjusted GPS data in cooperation with the relative positioning data obtained by the on-board sensing devices. It should be understood that each vehicle within the cluster can function as a host vehicle and find other remote vehicles within the cluster to determine an adjusted GPS data. Similar to the embodiment shown in FIG. 2, each vehicle can then determine which vehicle has the highest confidence level among the cluster of vehicles and utilize the vehicle with the highest confidence level for adjusting their GPS data.

Figure 4:
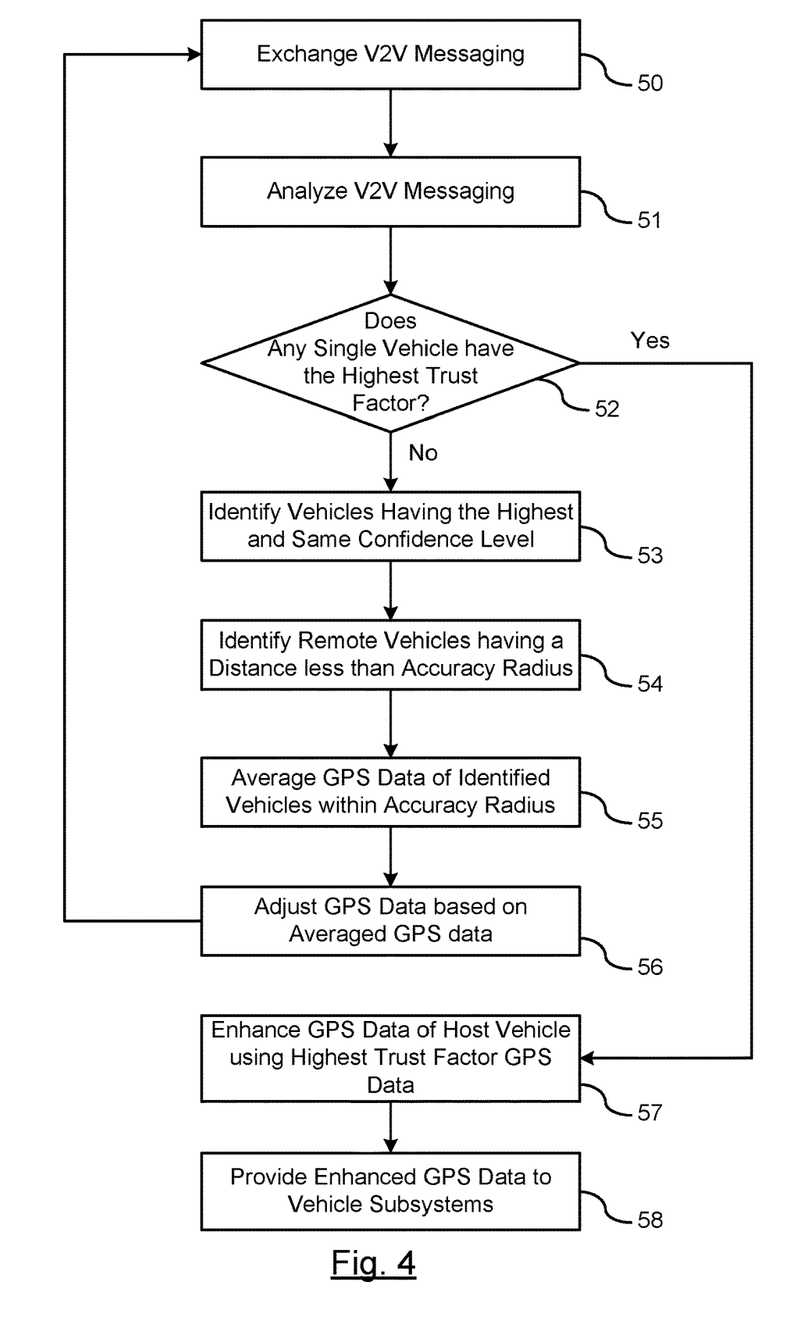
FIG. 4 is a flowchart for a method for enhancing accuracy of GPS data.

FIG. 4 illustrates an embodiment for enhancing a GPS position of a vehicle utilizing collaborative V2V communications.

In step 50, V2V messages are exchanged between vehicles in the cluster. Each V2V message includes GPS data and a respective confidence level of the GPS data for each vehicle's position.

In step 51, each V2V message received by each vehicle is analyzed the processor of the receiving vehicle.

In step 52, each vehicle determines whether any vehicle has a higher trust factor for GPS data among the vehicles within the cluster based on the received V2V messages. If a respective vehicle in the cluster has a higher trust factor relative to the other vehicles within the cluster, then the routine proceeds to step 57 to enhance the GPS position of other vehicles within the cluster having a lower GPS trust factor; otherwise, if no vehicle in the cluster has a higher trust factor among the vehicles, than the routine proceeds to step 53.

In step 53, each vehicle having the highest and same confidence level among the vehicles in the cluster is identified.

In step 54, each vehicle identified in step 53 functions as a host vehicle and determines whether the distance to the other surrounding vehicles having a same confidence level is less than the accuracy radius of the identified neighboring vehicle.

In step 55, each host vehicle calculates an average GPS data using the GPS data of each of the remote vehicles determined to be within the accuracy in addition to itself (e.g., host vehicle) and its own GPS data.

In step 56, the host vehicle adjusts its GPS data based on the averaged GPS data. A return is made to step 50 to transmit the adjusted GPS data as part of the V2V message.

In step 57, the GPS data from the vehicle having the highest confidence level among the plurality of vehicles is used by the vehicles within the cluster to enhance their GPS position.

In step 58, the vehicle's enhanced GPS position is provided to respective subsystems of the vehicle utilizing GPS data.

While certain embodiments of the present invention have been described in detail, those familiar with the art to which this invention relates will recognize various alternative designs and embodiments for practicing the invention as defined by the following claims.

What is claimed is:

1. A method of enhancing GPS data of a host vehicle within a cluster comprising:
    exchanging V2V messages within the cluster;
    identifying a respective vehicle having a highest GPS trust factor among the cluster utilizing GPS data within the V2V messages according to the steps of:
        identifying a confidence level of each vehicle's GPS data from each received V2V message;
        comparing the confidence levels associated with the GPS data of each vehicle as received in each V2V message;
        determining that a plurality of vehicles have a same confidence level among the vehicles having a highest confidence level within the cluster; and
        averaging the GPS data of the respective vehicles identified as having the same confidence level;
    adjusting the GPS data of the host vehicle as a function of a GPS position of the identified vehicle and relative position data between the host vehicle and the identified vehicle;
    wherein the step of averaging the GPS data is comprised of:
        determining an accuracy radius associated with each vehicle having the same confidence level, wherein the accuracy radius is a radius of a circular region around each vehicle where each accuracy radius represents a true position of the vehicle based on the confidence level;
        measuring a distance to each vehicle having the same confidence level;
        identifying respective remote vehicles where a distance to each respective remote vehicle is less than the accuracy radius of each remote vehicle, respectively; and
        averaging the GPS data of the host vehicle and the remote vehicles identified as having their distance to the remote vehicle less than the accuracy radius of each remote vehicle.

2. The method of claim 1 wherein the step of identifying the respective vehicle having the highest GPS trust factor further comprises the steps of:
    identifying a respective trust factor of each vehicle's GPS data from each received V2V message;
    comparing the trust factors associated with the GPS data of each vehicle as received in each V2V message; and
    selecting the vehicle having the highest GPS trust factor among the vehicles in the cluster in response to comparing the trust factors of each vehicle.

3. The method of claim 1 wherein the relative position data is determined utilizing Lidar measurement data.

4. The method of claim 1 wherein the relative position data is determined utilizing radar measurement data.

5. The method of claim 1 wherein the relative position data is determined utilizing ultrasonic measurement data.

6. The method of claim 1 wherein the adjusted GPS data determined by the host vehicle is broadcast to other vehicles as part of the V2V message.

7. The method of claim 1 wherein GPS data from only respective remote vehicles where relative positioning data is obtained is utilized for adjusting the GPS data.

8. The method of claim 1 wherein the cluster is formed by vehicles communicating within a predetermined distance of the host vehicle.

9. A collaborative GPS system:
    a V2V communication system exchanging V2V messages within a cluster;
    a processor identifying a respective vehicle having a highest GPS trust factor among the cluster, the processor adjusting GPS data of the host vehicle as a function of a GPS position of the identified vehicle and relative position data between the host vehicle and the identified vehicle, wherein the processor identifying the respective vehicle having the highest GPS trust factor includes the processor identifying a confidence level of each vehicle's GPS data from each received V2V message, the processor comparing the confidence levels associated with the GPS data of each vehicle in the cluster as received in each V2V message, the processor determining a plurality of vehicles having a same confidence level among the respective vehicles having a highest confidence level within the cluster, and wherein the processor averages the GPS data of the respective vehicles identified as having the same confidence level; and
    on-board sensing devices measuring a distance to each vehicle having the same confidence level;
    wherein the processor determines an accuracy radius associated with each vehicle having a same confidence level, the accuracy radius being a radius of a circular region around each vehicle where each location within the accuracy radius represents a true position of the vehicle based on the confidence level, the processor identifying respective remote vehicles where a distance to each respective remote vehicle is less than the accuracy radius of each remote vehicle respectively, and wherein the GPS data of a host vehicle and the GPS data of each remote vehicle identified as having their distance to the remote vehicle less than the accuracy radius of each remote vehicle are averaged;
wherein the V2V communication system broadcasts the adjusted GPS data.

10. The system of claim 9 wherein the processor identifying the respective vehicle having the highest GPS trust factor includes the processor identifying a trust factor of each vehicle's GPS data from each received V2V message, wherein the processor compares the trust factor associated with the GPS data of each vehicle in the cluster as received in each V2V message, and wherein the processor selects the vehicle having the highest trust factor among the vehicles in the cluster in response to comparing the trust factors of each vehicle.

11. The system of claim 9 wherein the on-board sensing devices include a Lidar measurement device, the Lidar measurement device measuring the relative position data.

12. The system of claim 9 wherein the on-board sensing devices include a radar measurement device, the radar measurement device measuring the relative position data.

13. The system of claim 9 wherein the on-board sensing devices include an ultrasonic measurement device, the ultrasonic measurement device measuring the relative position data.

14. The system of claim 9 wherein the V2V communication system broadcasts the adjusted GPS data determined by the host vehicle to other vehicles as part of the V2V message.

15. The system of claim 9 wherein the processor uses GPS data only from respective remote vehicles where relative position data is obtained for adjusting the GPS data.

16. The system of claim 9 wherein the cluster is identified by remote vehicles communicating within a predetermined distance of the host vehicle.

* * * * *